Jan. 25, 1938.   C. D. GARRIOTT   2,106,373
CABLE AND PIPE CLUTCH
Filed July 17, 1936   3 Sheets-Sheet 1

Inventor
C. D. Garriott
By Clarence A. O'Brien and
Hyman Berman
Attorneys

Jan. 25, 1938.  C. D. GARRIOTT  2,106,373
CABLE AND PIPE CLUTCH
Filed July 17, 1936  3 Sheets-Sheet 2

Inventor
C. D. Garriott
By Clarence A. O'Brien and
Hyman Berman
Attorneys

Jan. 25, 1938.  C. D. GARRIOTT  2,106,373
CABLE AND PIPE CLUTCH
Filed July 17, 1936  3 Sheets-Sheet 3
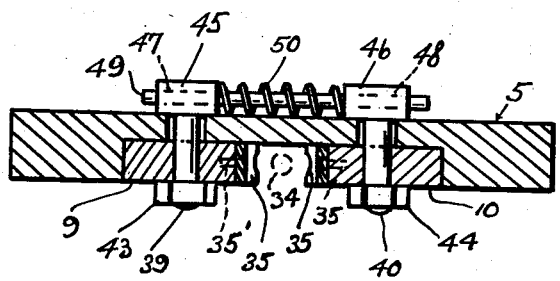
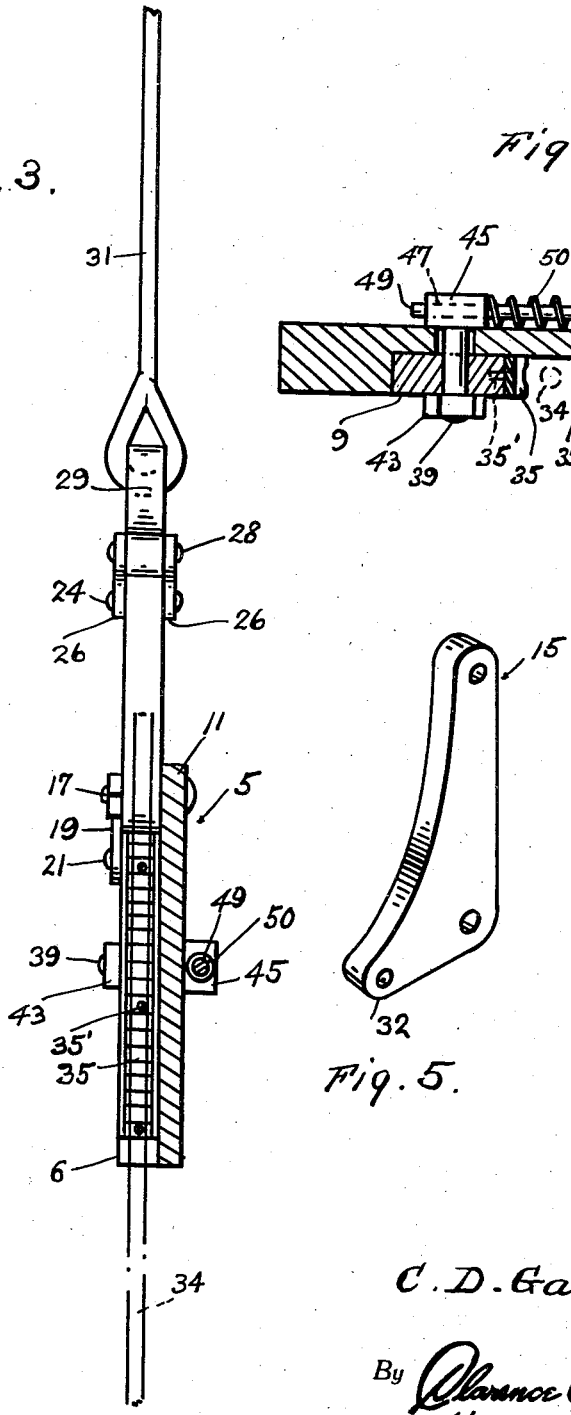
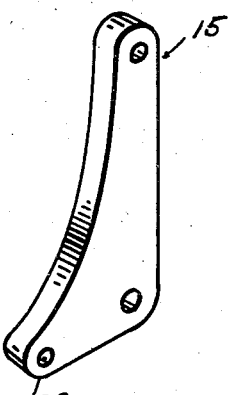
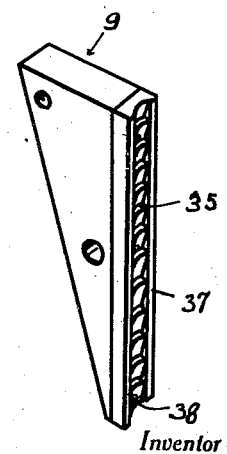
Inventor
C. D. Garriott
By Clarence A. O'Brien and Hyman Berman
Attorneys Patented Jan. 25, 1938

2,106,373

UNITED STATES PATENT OFFICE 2,106,373

CABLE AND PIPE CLUTCH

Carl D. Garriott, Eagle City, Okla.

Application July 17, 1936, Serial No. 91,241

4 Claims. (Cl. 294—114)

My invention relates generally to means for gripping and lifting cable and pipe, and particularly to a clutch of the self-releasing type for use in gripping and lifting cable and pipe particularly in oil well operations, and an important object of my invention is to provide a simple and mechanically efficient arrangement of this character.

Another important object of my invention is to provide in an arrangement of the character indicated above, replaceable gripping jaw surfaces or elements, which are interchangeable to adapt the arrangement to different work.

Another important object of my invention is to provide a simple and efficient mechanism in an arrangement of the character indicated above whereby the gripping jaws are automatically and fully released from the pipe or cable.

Other important objects of my invention will be apparent from a reading of the following description taken in connection with the drawings, wherein for purposes of illustration I have shown a preferred embodiment of my invention.

In the drawings:—

Figure 3 is a longitudinal vertical sectional view taken on the line 3—3 of Figure 1 looking toward the left in the direction of the arrows.

Figure 4 is a horizontal sectional view taken through Figure 1 approximately on the line 4—4 and looking downwardly in the direction of the arrows.

Figure 5 is a perspective view of one of the operating cranks.

Figure 6 is a perspective view of one of the jaws.

Figure 1:
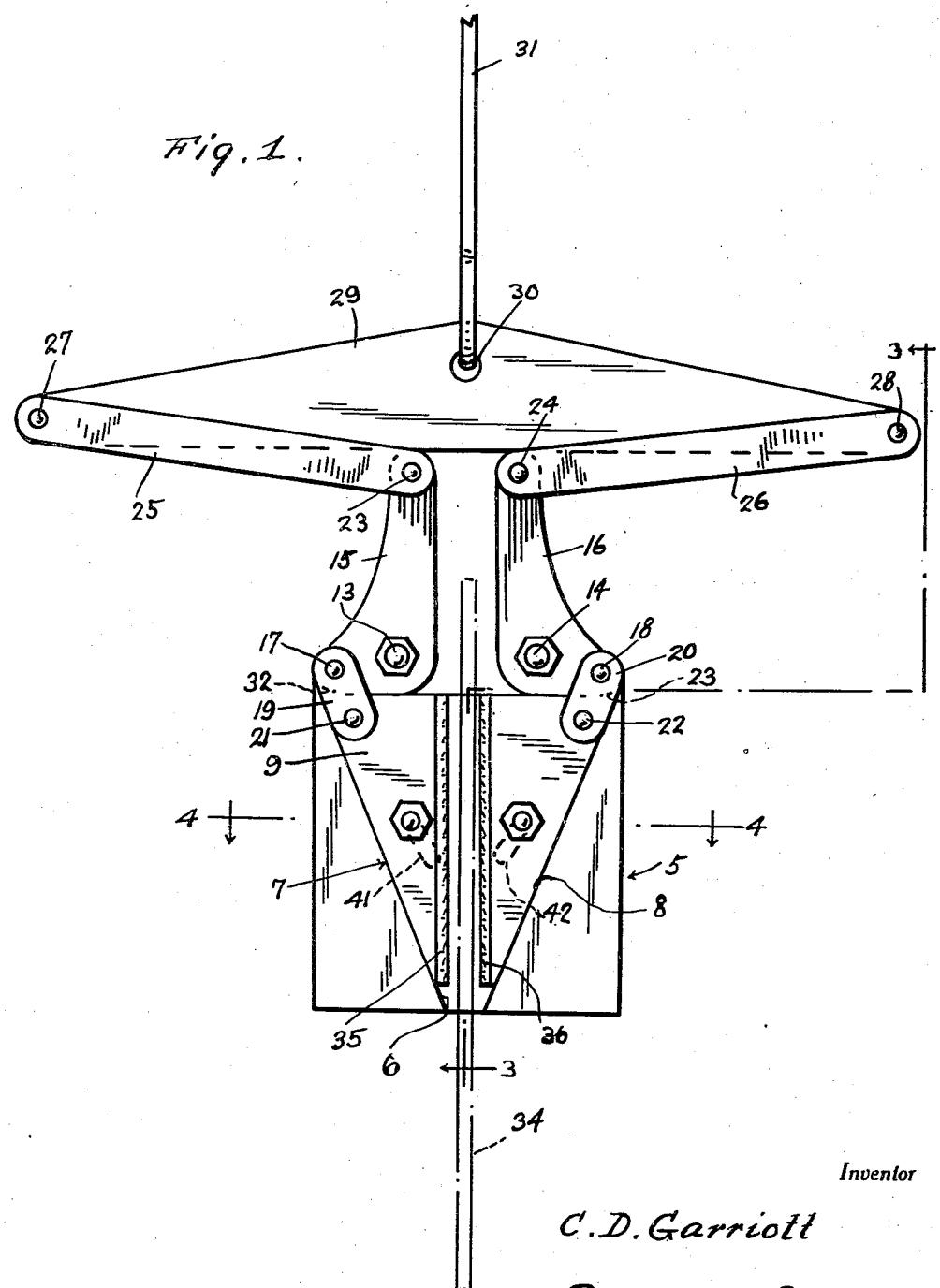
Figure 1 is a general side elevational view of the embodiment showing the same in initial position in nongripping relation to the pipe or cable.
Figure 2:
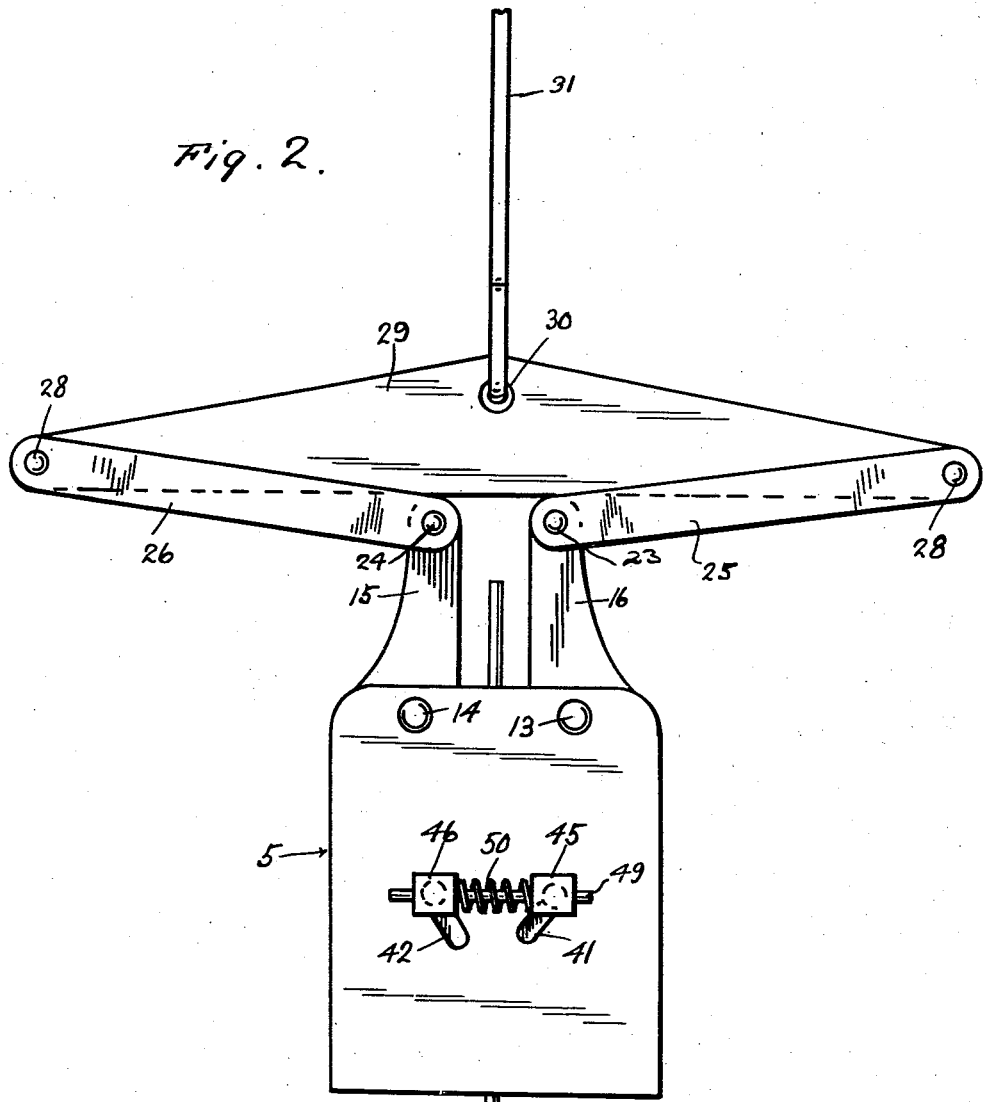
Figure 2 is an elevational view of the opposite side of Figure 1.
Figure 7:
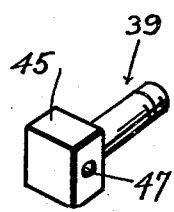
Figure 7 is a perspective view of an element of the jaw releasing mechanism.

Referring in detail to the drawings, the numeral 5 generally designates the body of the device which is generally rectangular in form and has in one side a V-shaped recess 6 which is inverted and opens through the top and through the bottom of the block 5, and whose side surfaces 7 and 8 constitute the slideways for the inverted triangular jaws 9 and 10 which have their hypotenuse sides sliding against the slideways 7 and 8.

Lugs 11 and 12 mounting pivot bolts 13 and 14, project from the upper end of the block 5 and pivoted on the bolts 13 and 14 are the jaw operating bell cranks 15 and 16. The bell cranks 15 and 16 are oppositely arranged with their foot portions laterally outwardly and oppositely placed, and have the foot portions pivoted as indicated by the numerals 17 and 18 to the upper ends of connecting links 19 and 20 which have their lower ends pivoted as indicated by the numerals 21, and 22 to the upper and laterally outward ends of the jaws 9 and 10, whereby the bell cranks 15 and 16 are operatively connected to the jaws 9 and 10.

The upper ends of the long vertical arms of the bell cranks 15 and 16 are pivoted as indicated by the numerals 23 and 24 to the inner ends of long links 25 and 26 which have their outer ends pivoted as indicated by the numerals 27 and 28 to the opposite ends of the yoke 29 which has a connector opening 30 or the equivalent at its center to receive the hoisting cable or rope 31. The parts concerned are so sized and arranged that the yoke 29, in the inoperative or initial position of the device lies close to the upper ends of the bell cranks 15 and 16, and the bell cranks are in erect positions.

The upper ends or bases of the jaws 9 and 10 are substantially straight and the bottoms of the bell cranks 15 and 16 are curved at their laterally outward extremities as indicated by the numerals 32 and 33 so as to act as cams for pushing downwardly the jaws 9 and 10 when the upper ends of the bell cranks 15 and 16 are moved apart by an upward relative movement of the yoke 29, when the hoisting cable 31 is pulled upwardly; whereby the jaws 9 and 10 are pushed downwardly and inwardly to grip opposite sides of the pipe or cable 34 which is disposed between the gripping faces 35 and 36 of the jaws. The gripping faces are so arranged as to be replaceable and interchangeable and are provided with teeth 37 as indicated in Figure 6, or with other suitably roughened or otherwise conditioned surfaces, according to the type of work to be performed. The gripping surfaces may be concave as indicated by the numeral 38 in Figure 6, or have other suitable contour.

Holding the jaws 9 and 10 slidably in place in the recess 6 are the bolt members or elements 39 and 40 which work slidably through diagonally arranged slots 41 and 42 which open through the back of the recess 6. Nuts 43 and 44 are threaded on the front ends of the bolt members 39 and 40, and on the rear ends thereof are fixed transversely elongated heads 45 and 46 which have smooth bores 47 and 48 therein which slidably receive the spring mounting bar 49 which has circumposed thereon the expanding spring 50 which works between and against the heads 45 and 46, so as to normally push these heads apart and consequently urge the jaws 9 and 10 into the open upward position illustrated in Figure 1 of the drawings. Suitable means is provided for holding the spring 51 in place as well as the bar 49.

The releasing spring 50 is of sufficient strength to operate the parts to the open position as soon as the tension is released on the hoisting cable 31, and this releasing of the jaws 9 and 10 from the pipe or cable with which the same were engaged is immediate and automatic. It will be observed that sufficient space is left above the jaws and above the block 5 and between the bell cranks 15 and 16 to work on couplings which may be on the upper end of the pipe or cable 34.

It will also be observed that the power application to the jaws to motivate the same into operative gripping position is applied at the outer upper corner of the jaws in a diagonal and natural direction, such as is pursued by a wedge, and that this provision makes more efficient action and easy working toward full gripping position, as well as easy and smooth releasing of the clutch.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. A clutch of the character described, said clutch comprising a body containing oppositely and downwardly converging slideways, opposed triangular jaws having their hypotenuse sides sliding on said slideways and having their altitude sides formed with gripping surfaces for gripping different sides of a cable or pipe, cams pivoted on said body above said jaws and having lobes operatively engaging said jaws, a lifting yoke for connection to lifting means, and links pivotally connected at their outer ends to transversely spaced points of said yoke and having their inward ends pivotally connected to said cams, whereby to cam said jaws downwardly into gripping relation to said cable when said yoke is raised out of initial position.

2. A clutch of the character described, said clutch comprising a body containing downwardly converging slideways, opposed triangular jaws having their hypotenuse sides sliding on said slideways and with their altitude sides formed with gripping surfaces for gripping different sides of a cable or pipe, cams mounted on said body and operatively engaging said jaws, a lifting yoke for connection to lifting means, and links pivotally connected at their outer ends to transversely spaced points of said yoke and having their inward ends pivotally connected to said cams, whereby to operate said jaws into gripping positions when said yoke is raised out of initial position, and spring means interposed between portions of said jaws for automatically operating said jaws to their initial non-gripping positions when the lifting of said yoke is decreased or stopped.

3. A clutch of the character described, said clutch comprising a body containing downwardly converging opposed slideways, opposed triangular jaws having their hypotenuse sides sliding on said slideways and with their altitude sides formed with gripping surfaces for gripping different sides of a cable or pipe, cams pivoted on said body above said jaws and having lobes operatively engaging said jaws, a lifting yoke for connection to lifting means, and links pivotally connected at their outer ends to transversely spaced points of said yoke and having their inward ends pivotally connected to said cams, whereby to operate said jaws into gripping positions when said yoke is raised out of initial position, said gripping surfaces being removable and interchangeable.

4. A clutch of the character described, said clutch comprising a body containing downwardly converging opposed slideways, opposed triangular jaws having their hypotenuse sides sliding on said slideways and with their altitude sides formed with gripping surfaces for gripping different sides of a cable or pipe, cams pivoted on said body above said jaws and having lobes operatively engaging said jaws, a lifting yoke for connection to lifting means, and links pivotally connected at their outer ends to transversely spaced points of said yoke and having their inward ends pivotally connected to said cams, whereby to operate said jaws into gripping positions when said yoke is raised out of initial position, and second links pivoted to said lobes and to said jaws for positively opening the jaws when the yoke is relaxed.

CARL D. GARRIOTT.